(12) United States Patent
Lee et al.

(10) Patent No.: US 9,002,212 B2
(45) Date of Patent: Apr. 7, 2015

(54) METHOD AND APPARATUS FOR BURST MODE CLOCK AND DATA RECOVERY

(75) Inventors: Mun Seob Lee, Daejeon (KR); Dong Soo Lee, Gwangju (KR); Geun Yong Kim, Goyang-si (KR); Hark Yoo, Gwangju (KR); Young Suk Lee, Gwangju (KR); Sung Chang Kim, Gwangju (KR); Jai Sang Koh, Gwangju (KR); Jong Deog Kim, Daejeon (KR)

(73) Assignee: Intellectual Discovery Co., Ltd., Seoul (KR)

( * ) Notice: Subject to any disclaimer, the term of this patent is extended or adjusted under 35 U.S.C. 154(b) by 775 days.

(21) Appl. No.: 13/213,813

(22) Filed: Aug. 19, 2011

(65) Prior Publication Data
US 2012/0045214 A1 Feb. 23, 2012

(30) Foreign Application Priority Data
Aug. 19, 2010 (KR) .................. 10-2010-0080484
Aug. 18, 2011 (KR) .................. 10-2011-0082209

(51) Int. Cl.
*H04J 14/00* (2006.01)
*H04B 10/00* (2013.01)
*H04Q 11/00* (2006.01)

(52) U.S. Cl.
CPC ... *H04Q 11/0067* (2013.01); *H04Q 2011/0064* (2013.01)

(58) Field of Classification Search
CPC ........ H04B 10/60; H04B 10/66; H04B 10/25; H04B 10/2503; H04B 10/2575; H04B 10/25754; H04B 10/2587; H04B 10/272; H04B 10/50; H04B 10/61; H04B 10/615; H04B 10/6164; H04B 10/63; H04J 3/07; H04J 3/73; H04J 3/076
See application file for complete search history.

(56) References Cited

U.S. PATENT DOCUMENTS

| | | | |
|---|---|---|---|
| 7,583,898 B1* | 9/2009 | Dalton et al. | 398/100 |
| 2009/0220232 A1* | 9/2009 | Sarashina | 398/77 |
| 2009/0274463 A1* | 11/2009 | Bernard et al. | 398/72 |
| 2010/0272436 A1* | 10/2010 | Mizutani et al. | 398/25 |

FOREIGN PATENT DOCUMENTS

| | | |
|---|---|---|
| JP | 2006-304070 A | 11/2006 |
| JP | 2009-182997 | 8/2009 |
| KR | 10-0473395 | 2/2005 |
| KR | 10-2010-0008560 A | 1/2010 |

* cited by examiner

*Primary Examiner* — Darren E Wolf
(74) *Attorney, Agent, or Firm* — Rabin & Berdo, P.C.

(57) ABSTRACT

Provided is an optical line terminator (OLT) to recover packet data and a clock from an optical signal including a silent interval. The OLT may receive packet data and a clock from at least one optical network unit (ONU). Even in a silent interval in which the at least one ONU does not transmit packet data, the OLT may successfully recover the clock.

10 Claims, 6 Drawing Sheets

METHOD AND APPARATUS FOR BURST MODE CLOCK AND DATA RECOVERY

CROSS-REFERENCE TO RELATED APPLICATION

This application claims the priority benefit of Korean Patent Application Nos. 10-2010-0080484 and 10-2011-0082209, filed on Aug. 19, 2010 and Aug. 18, 2011 respectively, in the Korean Intellectual Property Office, the disclosure of which is incorporated herein by reference.

BACKGROUND

1. Field of the Invention

Embodiments of the present invention relate to technology for burst mode clock and data recovery that may be applied to an optical line terminator (OLT) in an optical network, particularly, a passive optical network (PON).

2. Description of the Related Art

A passive optical network (PON) is in a one-to-N star topology in which a plurality of optical network units (ONUs) accesses a single optical line terminator (OLT) via a splitter RN. Data transmitted from the OLT to the ONUs correspond to consecutive signals that are broadcast to the plurality of ONUs. Each of the ONUs may extract its corresponding data and process the extracted data.

When data is to be transmitted from the plurality of ONUs to the OLT, the OLT may assign, to each of the ONUs, a time in which a corresponding ONU is allowed to transmit data, using a dynamic bandwidth algorithm in order to avoid collision between ONU data. Each of the ONUs may transmit data to the OLT only in the assigned time interval. Accordingly, data transmitted from the OLT to the ONUs may correspond to consecutive signals, whereas data transmitted from the ONUs to the OLT may correspond to signals in the consecutive burst form.

SUMMARY

An aspect of the present invention provides an optical line terminator (OLT) that may extract a clock from rapid burst mode packet data that is transmitted from an optical network unit (ONU) to an OLT, and may recover the clock.

Another aspect of the present invention also provides an OLT that may maintain a clock by inserting dummy data in a silent interval in which data is absent.

According to an aspect of the present invention, there is provided an OLT including: a receiver to receive an optical signal, including packet data, from each of a plurality of ONUs; a power recovery to recover the received optical signal to an electrical signal having a predetermined power corresponding to the received optical signal; and a data inserter to insert dummy data in a time interval in which the packet data is absent, in the recovered electrical signal.

According to another aspect of the present invention, there is provided an OLT including: a receiver to receive an optical signal, including packet data, from an ONU; a dummy data generator to generate dummy data synchronized with the packet data; and a dummy data inserter to insert the dummy data in a time interval in which the packet data is absent, in the optical signal.

According to still another aspect of the present invention, there is provided an ONU including: a transmitter to transmit, to an optical line terminator (OLT), an optical signal including packet data. The optical signal may be converted to an electrical signal and dummy data may be inserted in a time interval in which the packet data is absent, in the electrical signal.

According to embodiments of the present invention, there may be provided an OLT that may extract a clock from rapid burst mode packet data that is transmitted from an ONU to an OLT, and may recover the clock.

Also, according to embodiments of the present invention, there may be provided an OLT that may maintain a clock by inserting dummy data in a silent interval in which data is absent.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
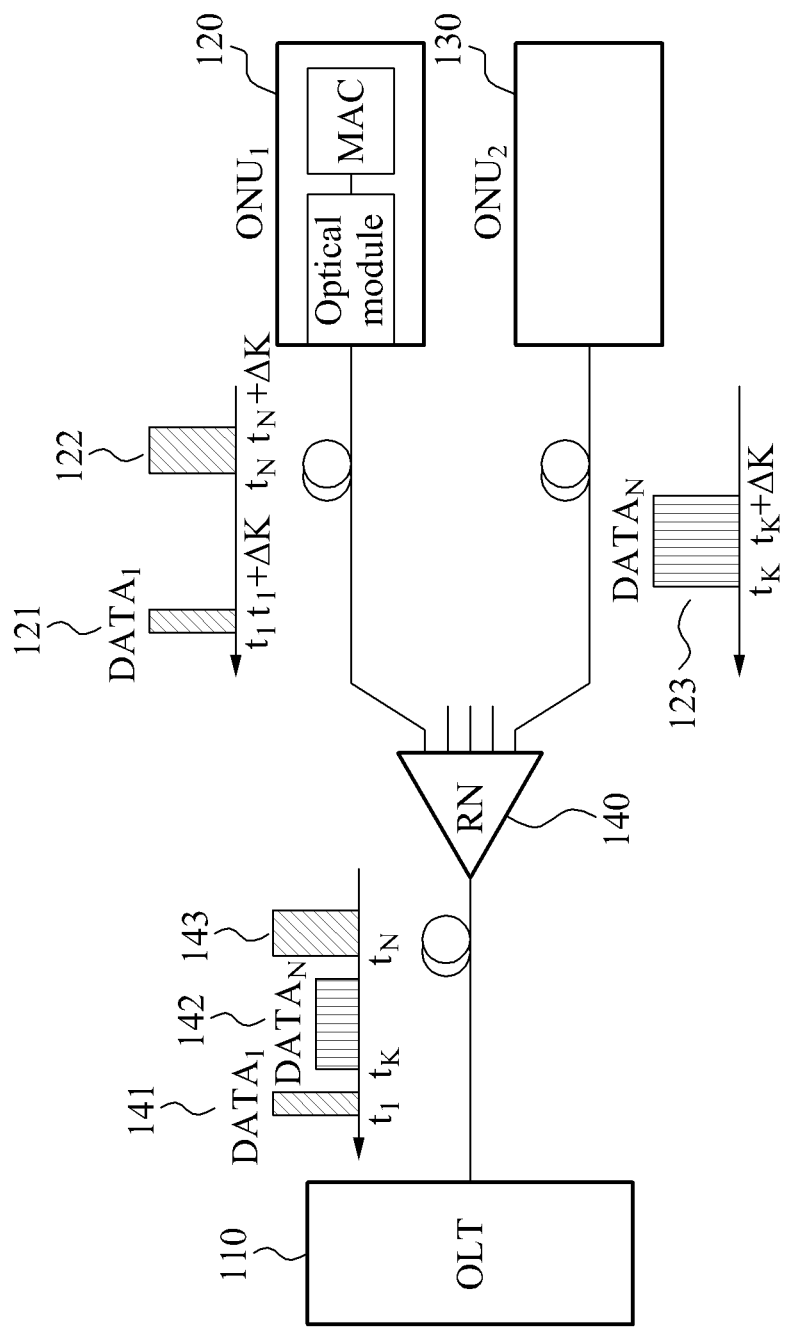
FIG. 1 is a diagram illustrating a structure of a passive optical network (PON) according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a structure of a passive optical network (PON) according to an embodiment of the present invention.

Referring to FIG. 1, each of a plurality of optical network units (ONUs), for example, $ONU_1$ 120 and $ONU_2$ 130 may transmit a packet and a clock to an optical line terminator (OLT) 110 using an optical network. The packet and the clock transmitted from each of the ONUs may be included in the same optical signal and thereby be transmitted.

Optical signals 121, 122, and 123 transmitted from the $ONU_1$ 120 and the $ONU_2$ 130 may be transmitted to a splitter RN 140. A channel formed between each of the $ONU_1$ 120 and the $ONU_2$ 130 and the splitter RN 140 may include an optical cable. A distance from the $ONU_1$ 120 to the splitter RN 140 may be different from a distance from the $ONU_2$ 130 to the splitter RN 140. Accordingly, the optical signals 121, 122, and 123 transmitted from the $ONU_1$ 120 and the $ONU_2$ 130 may undergo different transmission loss. That is, powers of optical signals 141, 142, and 143 received at the splitter 140 may be different from each other.

The splitter RN 140 may transmit the received optical signals 141, 142, and 143 to the OLT 110.

The OLT 110 may receive the optical signals 141, 142, and 143 via the splitter RN 140, and may recover packet data and a clock included in each of the received optical signals 141, 142, and 143.

A general optical receiving element used for an optical network may use a photodiode (PD) for photoelectric transformation, a transimpedance amplifier (TIA)/limiting amplifier (LIA), and a clock and data recovery (CDR) apparatus for extracting a clock in an optical signal transmitted using an optical network and arranging packet data in the extracted clock.

When no data is to be transmitted from each of ONUs, an uplink signal from each of the ONUs may have a silent interval. In the silent interval, none of the ONUs may transmit a signal to an OLT. In this case, the OLT may not receive even a clock from the ONUs. A general CDR may not maintain a clock. Accordingly, the OLT may use a burst mode CDR that may quickly recover the clock even in the silent interval.

Figure 2:
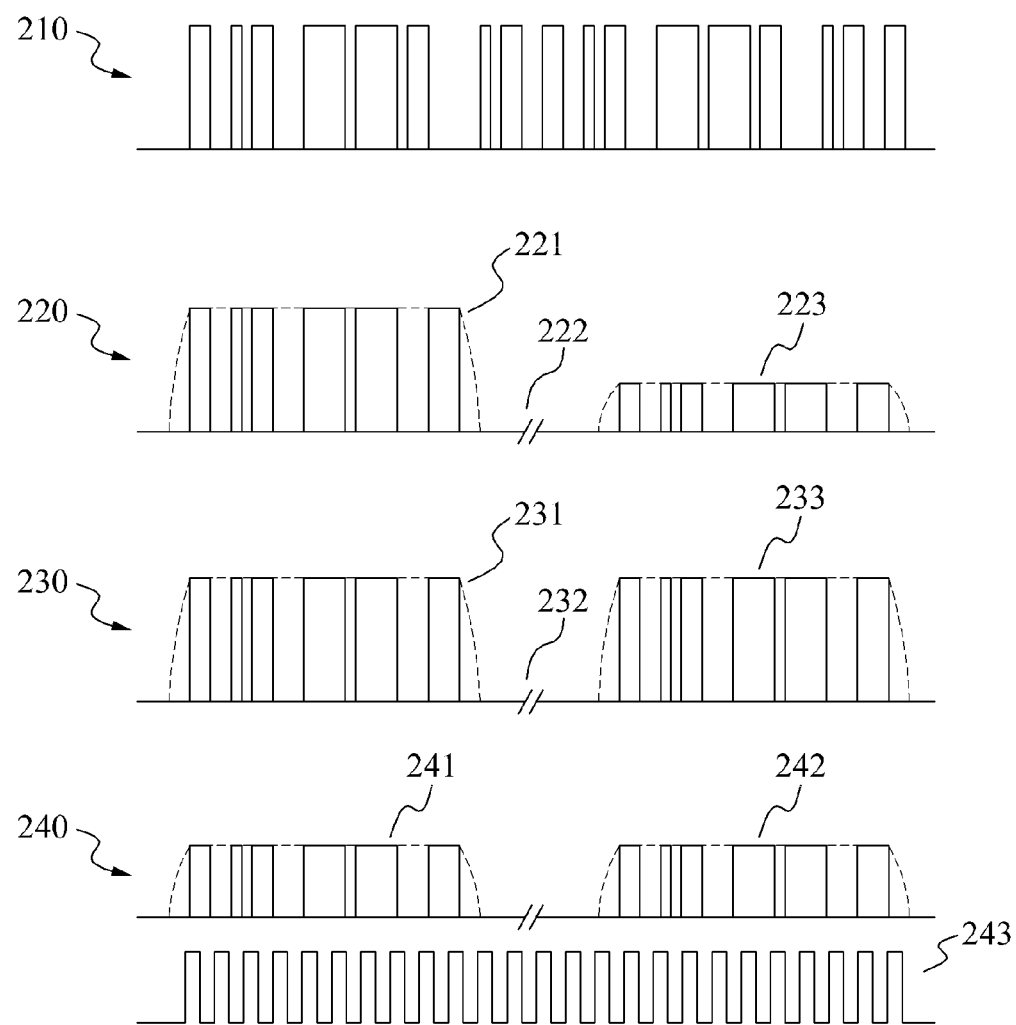
FIG. 2 is a diagram illustrating burst mode packet data according to an embodiment of the present invention.

FIG. 2 is a diagram illustrating burst mode packet data according to an embodiment of the present invention.

Referring to an example 210 of optical signals transmitted from a plurality of ONUs, each of the ONUs may have a guard time to prevent a collision between packet data. When there is no uplink data, a silent interval may be included.

Referring to an example 220 of optical signals received at a splitter, a transmission loss of an optical signal 221 transmitted from a first ONU is relatively small, whereas a transmission loss of an optical signal 223 transmitted from a second ONU is relatively great. In a salient interval 222, an optical signal may be transmitted from none of the first ONU and the second ONU.

Referring to an example 230 of optical signals received at an OLT, the OLT may recover powers of received optical signals 231 and 233. When the powers of the optical signals 231 and 233 is recovered, the power of the optical signal 231 transmitted from the first ONU may become equal to the power of the optical signal 233 transmitted from the second ONU. No optical signal may be present in a silent interval 232.

The OLT may recover a data packet 240 and a clock 243 from an optical signal of which power is recovered. The recovered data packet 240 may include a packet 241 transmitted from the first ONU, and a packet 242 transmitted from the second ONU. The recovered data packet 240 may include a silent interval. The recovered clock may not include the salient interval.

That is, the OLT may need to recover the clock even in an interval in which no signal is received from ONUs.

The OLT may employ a CDR of a general phase locked loop (PLL) scheme and may also employ a CDR of an oversampling scheme. When the OLT employs the CDR of the general PLL scheme, it may be difficult to recover a clock due to a large phase difference, resulting from a distance difference between ONUs, and due to a large loop time recovering in a silent interval. When the OLT employs the CDR of the oversampling scheme, a burst mode CDR of the oversampling scheme may need to maintain an oversampling rate of greater than four folds or eight folds when input data corresponds to a high speed signal of greater than 2.5 Gbps. The design of the CDR operating in the above high bandwidth may be difficult and be very expensive and thus, may not be readily applied.

Figure 3:
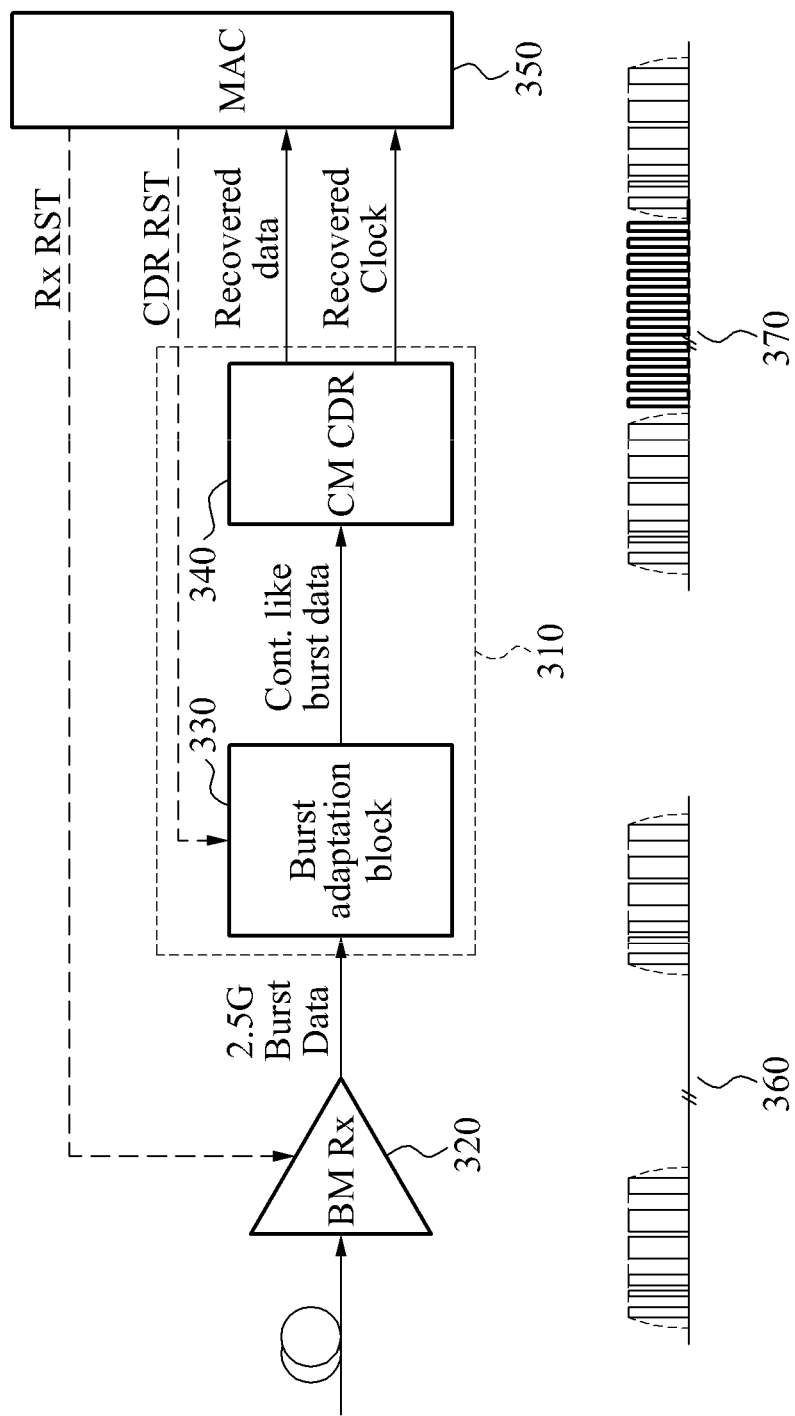
FIG. 3 is a diagram illustrating a structure of an optical line terminator (OLT) according to an embodiment of the present invention.

FIG. 3 is a diagram illustrating a structure of an OLT according to an embodiment of the present invention.

Referring to FIG. 3, the OLT may include a power recovery device (hereinafter "power recovery") 320, a burst adaptation block 330, a CDR device (hereinafter "CDR") 340, and a Media Access Control (MAC) device 350. A block 310 including the burst adaptation block 330 and the CDR 340 may convert a received signal of a burst mode to a general received signal and thereby extract a clock signal.

The power recovery 320 may recover optical signals, having different optical powers, to electrical signals having a predetermined power. In the case of an electrical signal 360 recovered by the power recovery 320, no signal may be present in a silent interval. In this case, a general CDR may not extract a clock.

The burst adaptation block 330 may insert dummy data in a silent interval in which packet data does not exist. According to an aspect, dummy data and packet data may be synchronized with each other. In this case, a generation rate of the dummy data may match a transmission rate of the packet data.

A signal 370 in which dummy data is inserted in the silent interval may have a similar form to a general received signal, instead of a received signal of a burst mode. As shown in FIG. 3, the insertion of dummy data forms in the silent interval a monotonous electrical signal from which a clock corresponding to the packet data is recoverable. Accordingly, even though the general CDR 340 is employed, the CDR 340 may readily recover packet data and a clock from the signal 370 in which the dummy data is inserted in the silent interval. In this example, the CDR 340 may recover the packet data and the clock using a general PLL scheme or a delay locked loop (DLL) scheme.

The MAC 350 may process data using the recovered packet data and clock. According to an aspect, the MAC 350 may accurately determine a start point of the silent interval and an end point of the silent interval based on upper layer information included in the recovered data. In this case, the MAC 350 may generate a control signal and control an operation of the power recovery 320 and the burst adaptation block 330 according to the control signal.

For example, the burst adaptation block 330 may receive the control signal from the MAC 350 and may insert dummy data in an interval from the start point of the silent interval to the end point of the silent interval.

Also, the power recovery 320 may receive the control signal from the MAC 350 and may not operate in the interval from the start point of the silent interval to the end point of the silent interval.

Figure 4:
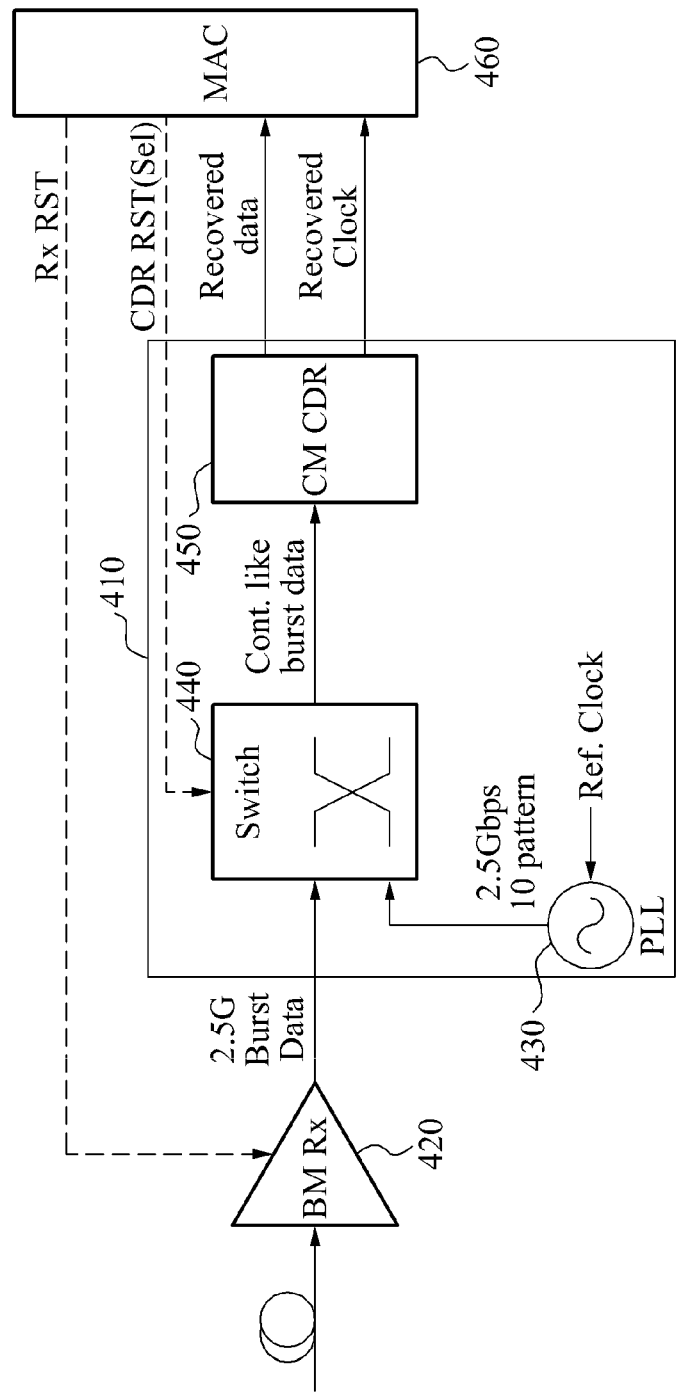
FIG. 4 is a diagram illustrating a structure of an OLT according to another embodiment of the present invention.

FIG. 4 is a diagram illustrating a structure of an OLT according to another embodiment of the present invention.

Referring to FIG. 4, the OLT may include a power recovery 420, a signal processing module 410, and a MAC 460. As shown in FIG. 4, the signal processing module 410 may include a dummy data generator 430, a switch 440, and a CDR 450.

An operation of the power recovery 420 and the MAC 460 may be similar to an operation of the power recovery 320 and the MAC 460 and thus, further detailed description related thereto will be omitted here.

The dummy data generator 430 may generate dummy data synchronized with packet data. According to an aspect, the dummy data generator 430 may receive a reference clock and generate dummy data synchronized with packet data, based on the reference clock.

The switch 440 may insert dummy data generated from the dummy data generator 430 and may receive a power-recovered electrical signal from the power recovery 420. The switch 440 may transmit the power-recovered electrical signal to the CDR 450 in a time interval excluding the silent interval, and may transmit dummy data to the CDR to 450 in the silent interval.

Figure 5:
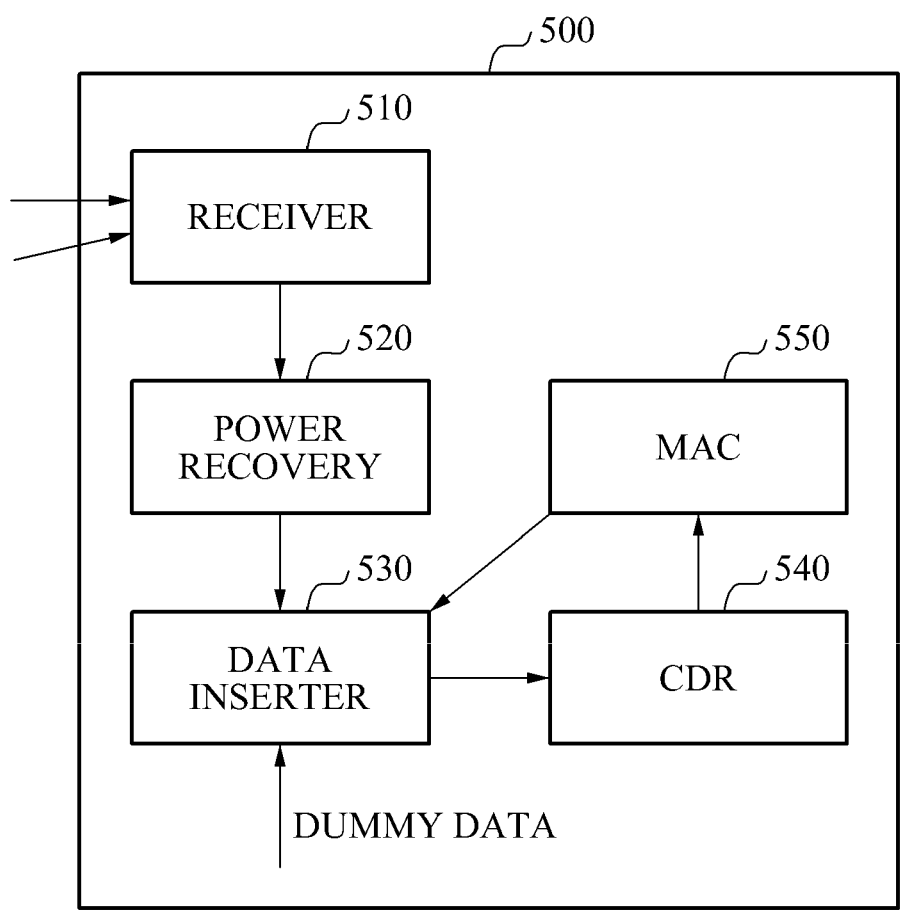
FIG. 5 is a diagram illustrating a structure of an OLT according to still another embodiment of the present invention.

FIG. 5 is a diagram illustrating a structure of an OLT 500 according to still another embodiment of the present invention.

Referring to FIG. 5, the OLT 500 may include a receiver 510, a power recovery 520, a data inserter 530, a CDR 540, and a MAC 550.

The receiver 510 may receive an optical signal, including packet data, from each of a plurality of ONUs. Each received optical signal may undergo a transmission loss in proportion to a distance from a corresponding ONU. Accordingly, powers of the received optical signals may be different from each other based on the ONUs.

According to an aspect, each optical signal may include packet data and a clock. Packet data included in the optical signal may be temporarily divided using a guard time interval.

Only when data to be transmitted to the OLT 500 exists, each of the ONUs may transmit an optical signal. Accordingly, a silent interval in which none of the ONUs transmits data may be included in the optical signal received at the receiver 510.

The power recovery 520 may modulate a received optical signal and thereby generate an electrical signal corresponding to the received optical signal. In this case, electrical signals may have the same power regardless of ONUs having transmitted optical signals. That is, the power recovery 520 may generate an electrical signal of which power corresponds to a predetermined power level, and of which a temporal position corresponds to a temporal position of an optical signal, thereby recovering the power loss occurring due to the transmission loss. The temporal position of the electrical signal corresponds to the temporal position of the optical signal and thus, the silent interval in the optical signal may match the silent interval in the electrical signal.

Although not illustrated in FIG. 5, the OLT 500 may include a dummy data generator. The dummy data generator may generate dummy data synchronized with packet data. That is, a generation rate of the dummy data may match a transmission rate of the packet data.

The data inserter 530 may insert the dummy data in a silent interval in which packet data does not exist, in the electrical signal. When the dummy data is inserted, the electrical signal may exhibit a consecutive form as shown in the signal 370 of FIG. 3. The CDR 540 in a general structure may readily recover packet data and clock transmitted from the ONU, from the electrical signal. The CDR 540 may readily recover packet data and the clock using a PLL or a DLL.

The MAC 550 may extract upper layer information from the recovered packet data. The upper layer information may include accurate silent interval information in the optical signal transmitted from the ONU. When the MAC 550 may accurately determine a start point and an end point of the silent interval, the MAC 550 may generate a control signal for controlling the power recovery 520 or the inserter 530.

For example, the power recovery 520 may not operate in the silent interval according to the control signal. Also, the data inserter 530 may not transmit dummy data to the CDR 540 in the silent interval, and may transmit the recovered electrical signal to the CDR 540 in a time interval excluding the silent interval.

Figure 6:
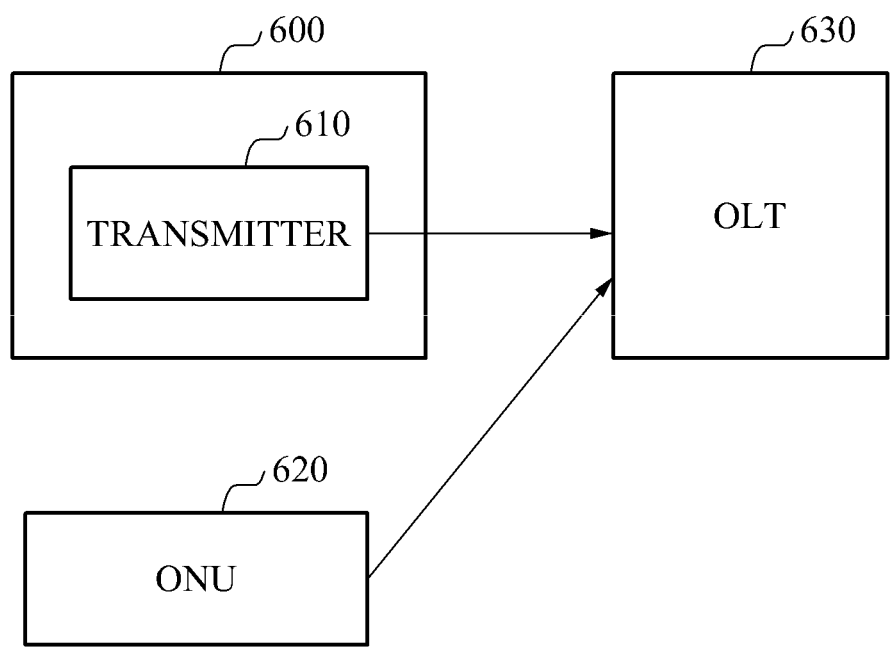
FIG. 6 is a diagram illustrating a structure of an optical network unit (ONU) according to an embodiment of the present invention.

FIG. 6 is a diagram illustrating a structure of an ONU 600 according to an embodiment of the present invention.

Referring to FIG. 6, the ONU 600 may include a transmitter 610.

The transmitter 610 may transmit, to an OLT 630, an optical signal including packet data and a clock. In addition to the ONU 600, an ONU 620 corresponding to a second ONU may also transmit an optical signal to the OLT 630. The transmitter 610 may temporally divide packet data using a guard time interval and thereby transmit the temporally divided packet data.

Each of the ONUs 600 and 620 may transmit an optical signal only when data to be transmitted exists. Accordingly, a time interval in which no data to be transmitted from the ONUs 600 and 620 exists may correspond to a silent interval.

The optical signal transmitted to the OLT 630 may be converted to an electrical signal. The electrical signal may have a silent interval in the same time interval as a silent interval of the optical signal. Dummy data may be inserted in the silent interval of the electrical signal.

The packet data and the clock transmitted from the transmitter 610 may be recovered from the electrical signal in which the dummy data is inserted.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An optical line terminator (OLT), comprising:
a receiver configured to receive an optical signal including packet data from one of a plurality of optical network units (ONUs), the received optical signal including a silent interval during which no packet data is transmitted by the ONUs;
a power recovery device configured to convert the received optical signal to thereby generate an electrical signal, the generated electrical signal having a temporal position corresponding to that of the received optical signal, such that the generated electrical signal has a silent interval corresponding to that of the received optical signal; and
a data inserter connected to the power recovery device and configured to generate an electrical signal including the electrical signal generated by the power recovery device with dummy data in the silent interval, the dummy data having a same transmission rate as, and being synchronized with, the packet data of the received optical signal, to thereby form in the silent interval a monotonous electrical signal from which a clock corresponding to the packet data is recoverable; and
a Media Access Control (MAC) device configured to determine start and end points of the silent interval and to generate a control signal indicative thereof, the control signal being sent to the power recovery device and the data inserter, and being configured to cause the power recovery device to stop generating electric signals during the silent interval, and to cause the data inserter to generate the monotonous electrical signal during the silent interval.

2. The OLT of claim 1, wherein
the optical signal includes a clock signal received from the one ONU, and
the clock recovered from the monotonous electrical signal has a same frequency as that of the clock signal received from the one ONU.

3. The OLT of claim 1, wherein the packet data is temporally divided using a guard time interval.

4. The OLT of claim 1, wherein the power of the electrical signal corresponds to a predetermined power level.

5. The OLT of claim 1, further comprising:
a clock and data recovery (CDR) device configured to recover the packet data and a clock signal from the electrical signal in which the dummy data is inserted.

6. The OLT of claim 5, wherein the CDR device recovers the packet data and the clock signal from the dummy data-inserted electrical signal using a phase lock loop (PLL) or a delay lock loop (DLL).

7. An optical line terminator (OLT), comprising:
a receiver configured to receive an optical signal including packet data from an optical network unit (ONU), the received optical signal including a silent interval during which no packet data is transmitted by the ONU;
a dummy data generator configured to generate dummy data that have a same transmission rate as, and are synchronized with, the packet data of the received optical signal;
a dummy data inserter configured to insert the dummy data in the silent interval of the received optical signal, to thereby form in the silent interval a monotonous electrical signal from which a clock corresponding to the packet data is recoverable; and
a Media Access Control (MAC) device configured to determine start and end points of the silent interval and to generate a control signal indicative thereof, the control signal being sent to the dummy data inserter, and being configured to cause the dummy data inserter to insert the monotonous electrical signal during the silent interval.

8. The OLT of claim 7, further comprising:
a clock and data recovery (CDR) device configured to recover the packet data and a clock signal from the optical signal in which the dummy data is inserted.

9. The OLT of claim 8, wherein the CDR device transmits the packet data and a clock signal recovered from the optical signal in which the dummy data is inserted to the MAC.

10. The OLT of claim 7, further comprising:
a power recovery device configured to recover the power of the received optical signal to a predetermined power level,
wherein the dummy data inserter inserts the dummy data in the optical signal of which the power is recovered.

* * * * *